Figures 18, 18A:
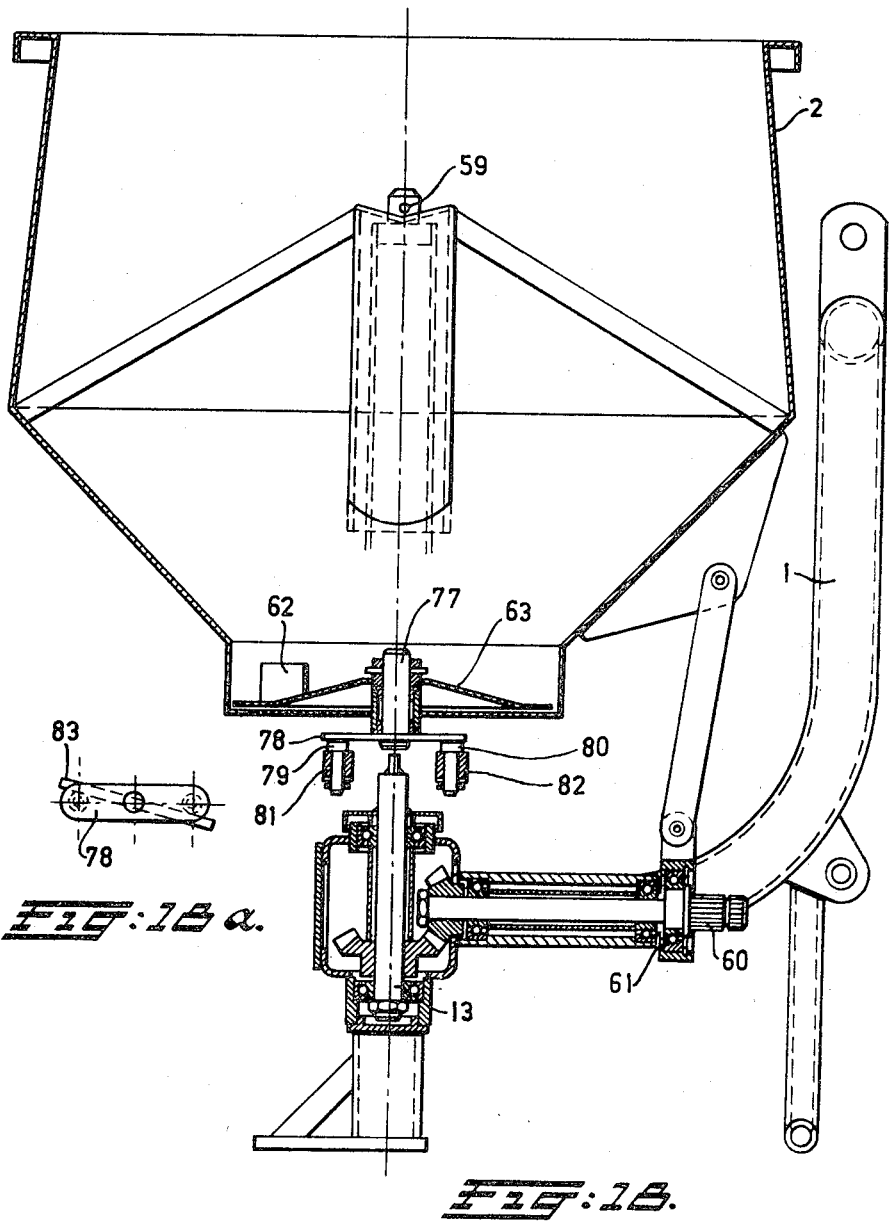

United States Patent

[11] 3,633,796

| [72] | Inventor | Petrus Wilhelmus Zweegers<br>Nieuwendyk 46, Geldrop, Netherlands |
|---|---|---|
| [21] | Appl. No. | 812,805 |
| [22] | Filed | Apr. 2, 1969 |
| [45] | Patented | Jan. 11, 1972 |
| [32] | Priorities | Apr. 11, 1968 |
| [33] | | Netherlands |
| [31] | | 6805161; |
| | | Feb. 19, 1969, Netherlands, No. 6902577 |

[54] APPARATUS FOR SPREADING OR SOWING GRANULAR OR PULVERULENT MATERIAL
39 Claims, 25 Drawing Figs.

[52] U.S. Cl. .................................................... 222/176,
222/352, 222/371, 239/664
[51] Int. Cl. .................................................... A01c 15/18
[50] Field of Search ........................................ 222/197,
344, 352, 371, 229, 176, 196, 232, 233, 201, 200,
270, 280, 344, 354, 178, 305, 371; 198/38, 155;
239/664

[56] References Cited
UNITED STATES PATENTS

| 12,152 | 1/1855 | Anderson | 222/371 X |
|---|---|---|---|
| 20,001 | 4/1858 | McWhorter | 222/352 X |
| 693,724 | 2/1902 | Ledbetter | 111/59 |
| 1,493,590 | 5/1924 | Antholz | 222/176 |
| 1,680,441 | 8/1928 | Adams | 198/155 X |
| 1,708,062 | 4/1929 | Hartshorn | 222/352 X |
| 1,768,534 | 7/1930 | Aiken | 198/155 |
| 1,938,423 | 12/1933 | Greer | 222/352 X |
| 1,966,192 | 7/1934 | Tiede | 222/176 X |
| 2,293,517 | 8/1942 | Messinger | 222/176 |
| 2,589,425 | 3/1952 | Newman | 222/177 X |
| 2,758,756 | 8/1956 | Tea | 222/270 |
| 2,767,963 | 10/1956 | Ringen | 259/10 |
| 2,931,484 | 4/1960 | Muller | 198/38 |
| 3,110,419 | 11/1963 | Atkins | 222/55 |
| 3,463,360 | 8/1969 | Dorfman | 222/270 X |
| 3,497,109 | 2/1970 | Leach | 222/485 X |

FOREIGN PATENTS

| 202,862 | 8/1956 | Australia | 222/352 |
|---|---|---|---|

*Primary Examiner*—Robert B. Reeves
*Assistant Examiner*—Thomas E. Kocovsky
*Attorney*—Breitenfeld & Levine ABSTRACT: Material-spreading apparatus having a driven endless belt which carries a series of pivotable trays and is bodily movable in transverse direction. Each tray has a pin which rests on a stepped supporting ledge so that it can pivot for discharging its contents when it reaches the end of a step of the ledge. A central hopper fills both runs of the belt.

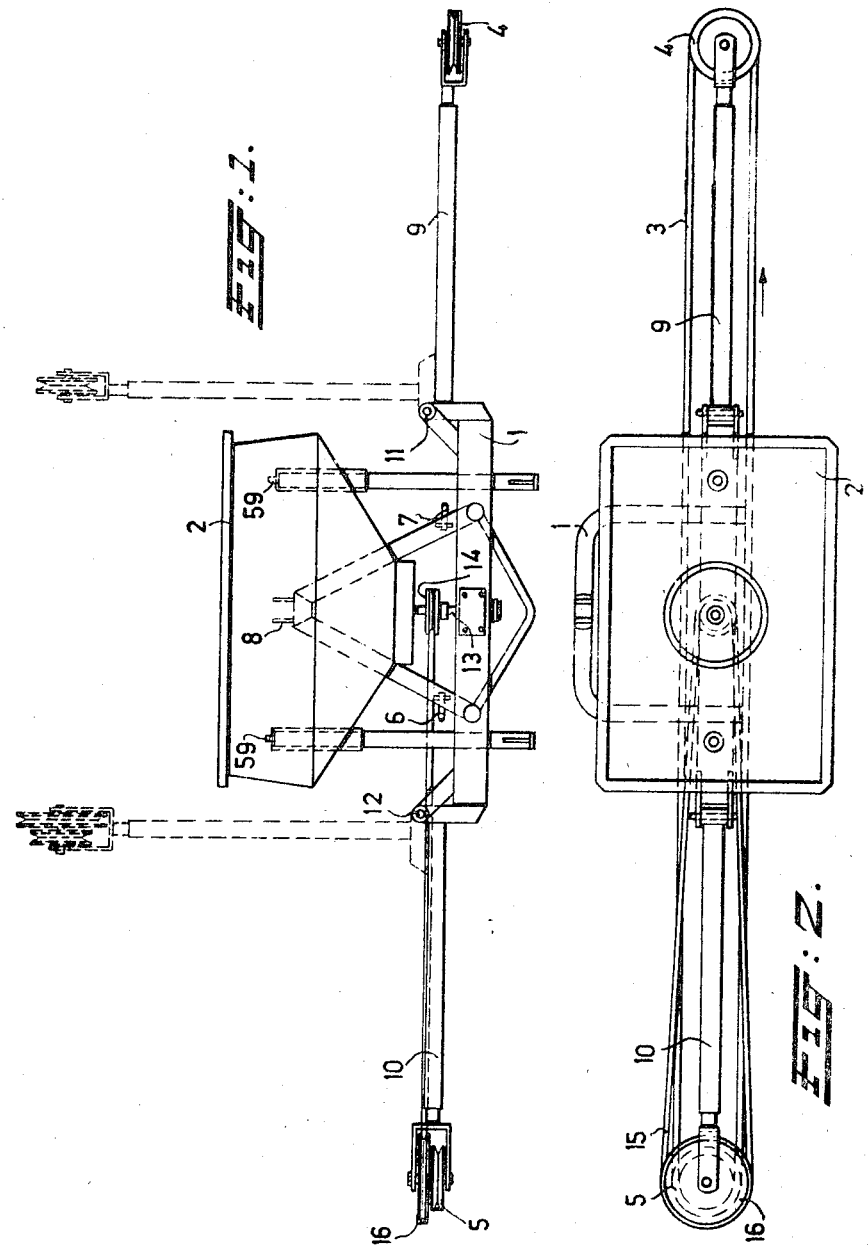

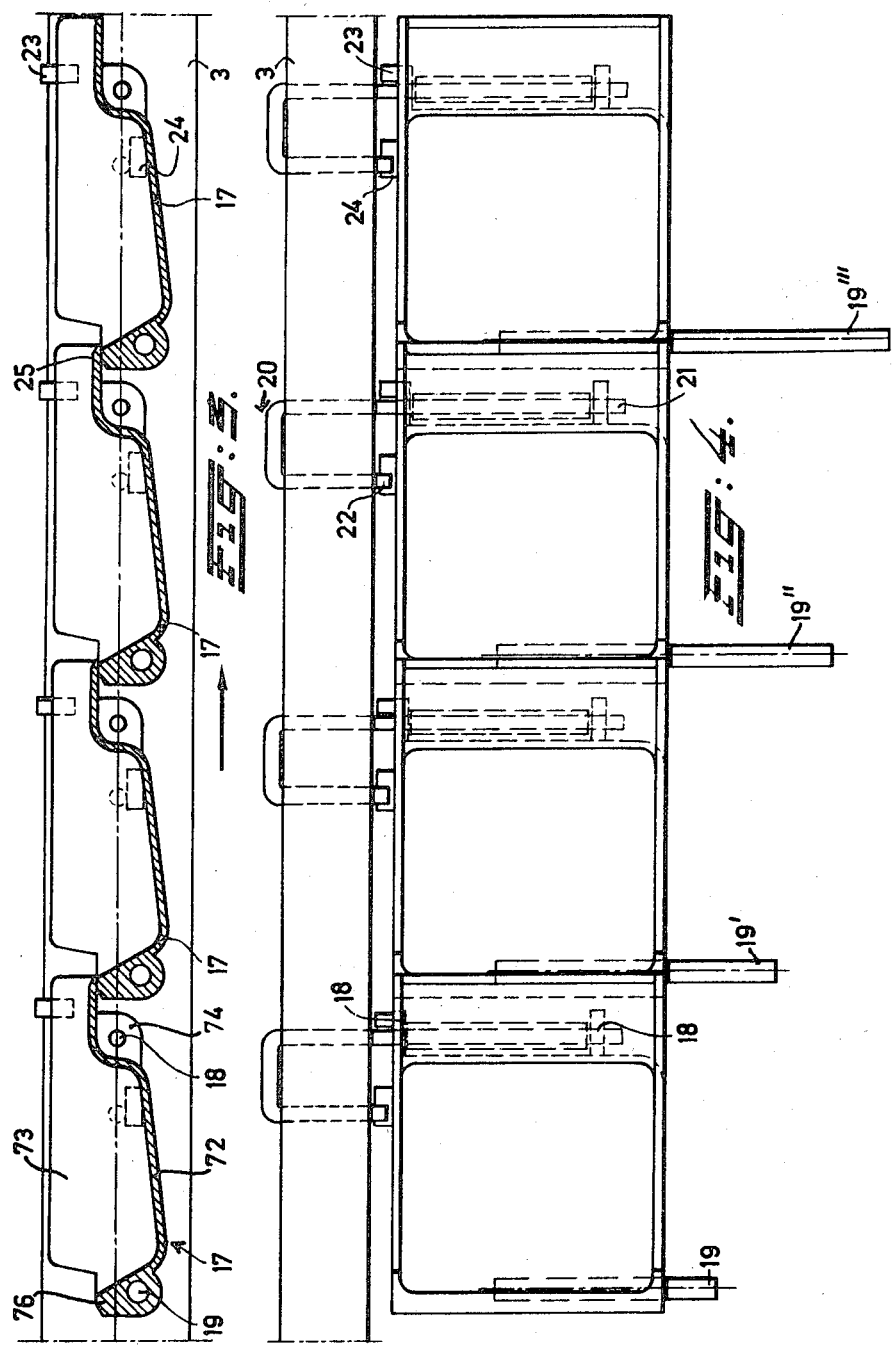

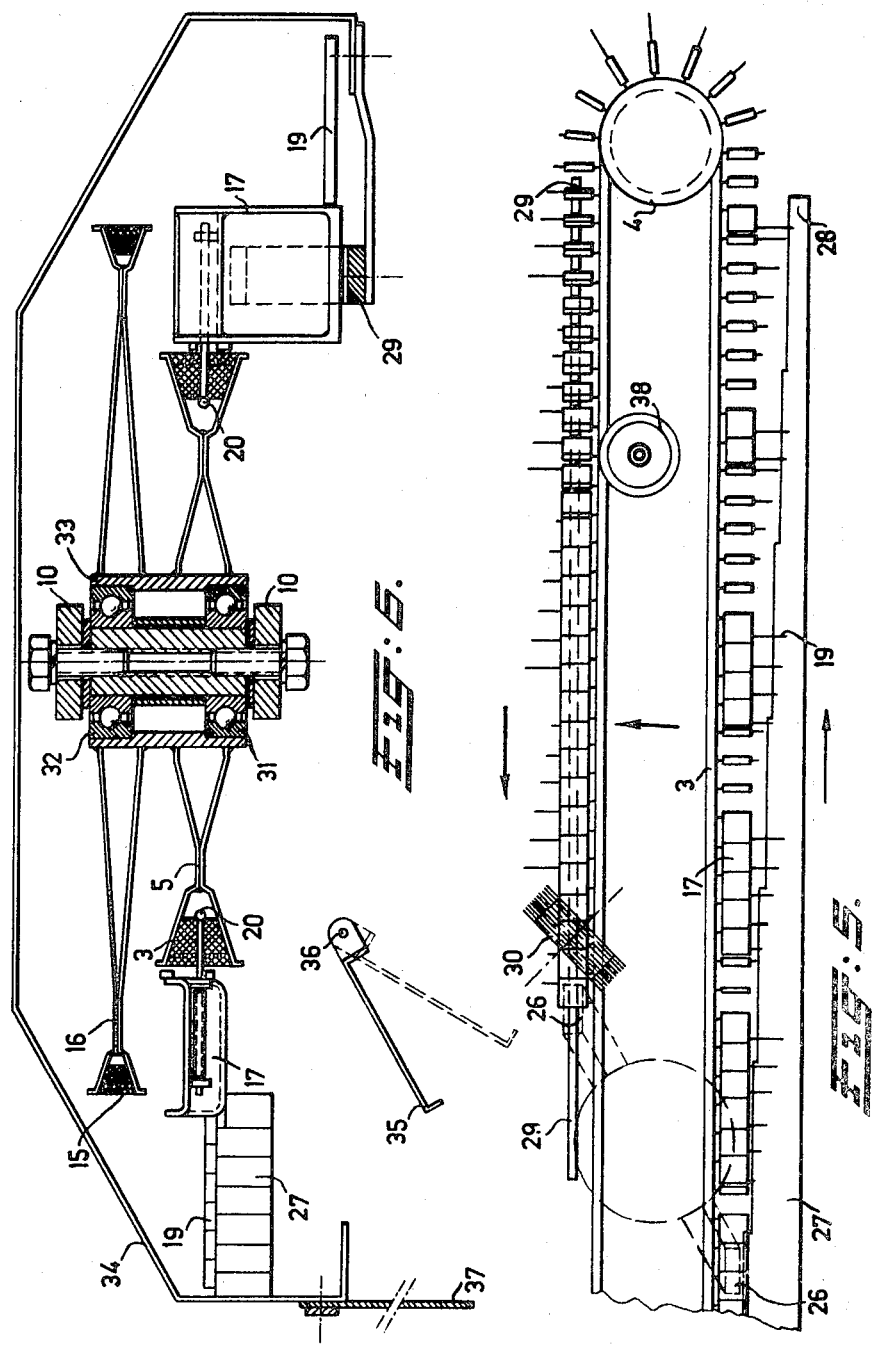

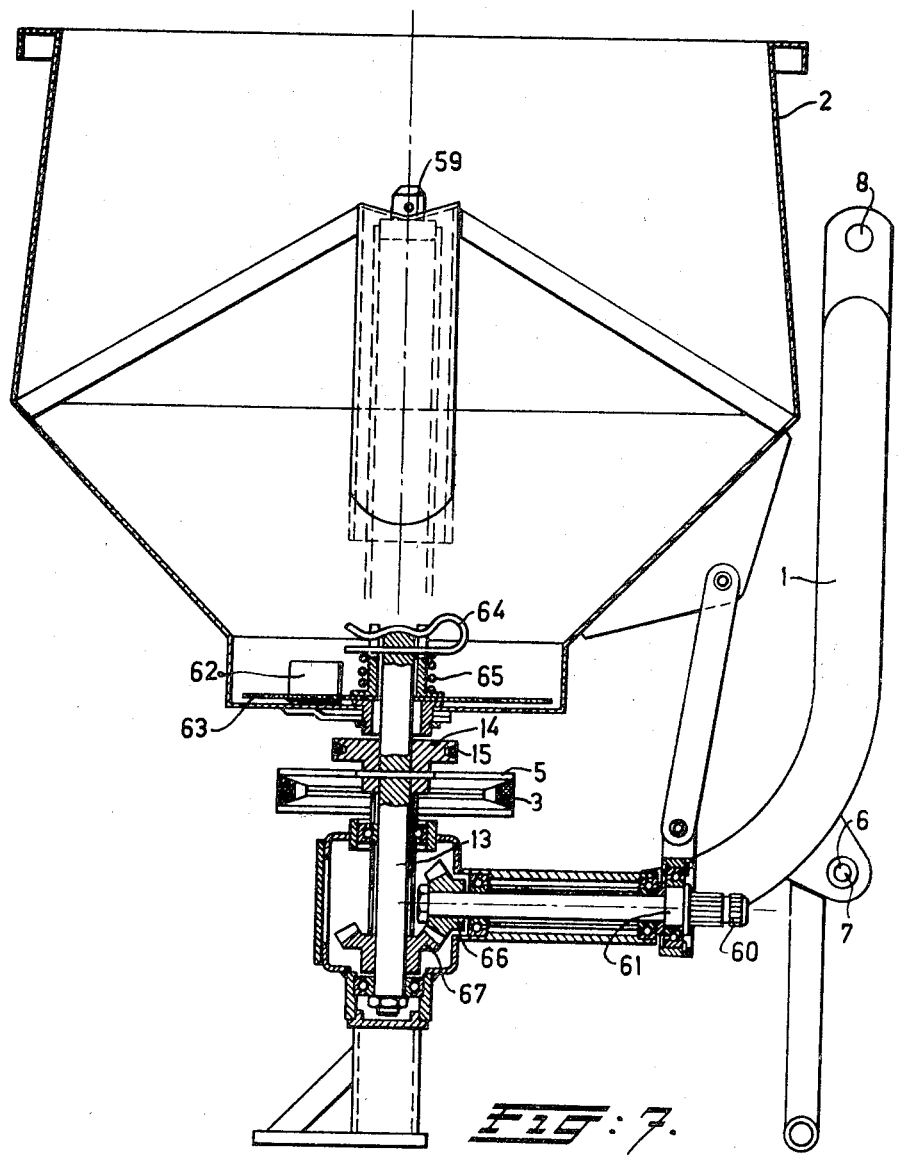

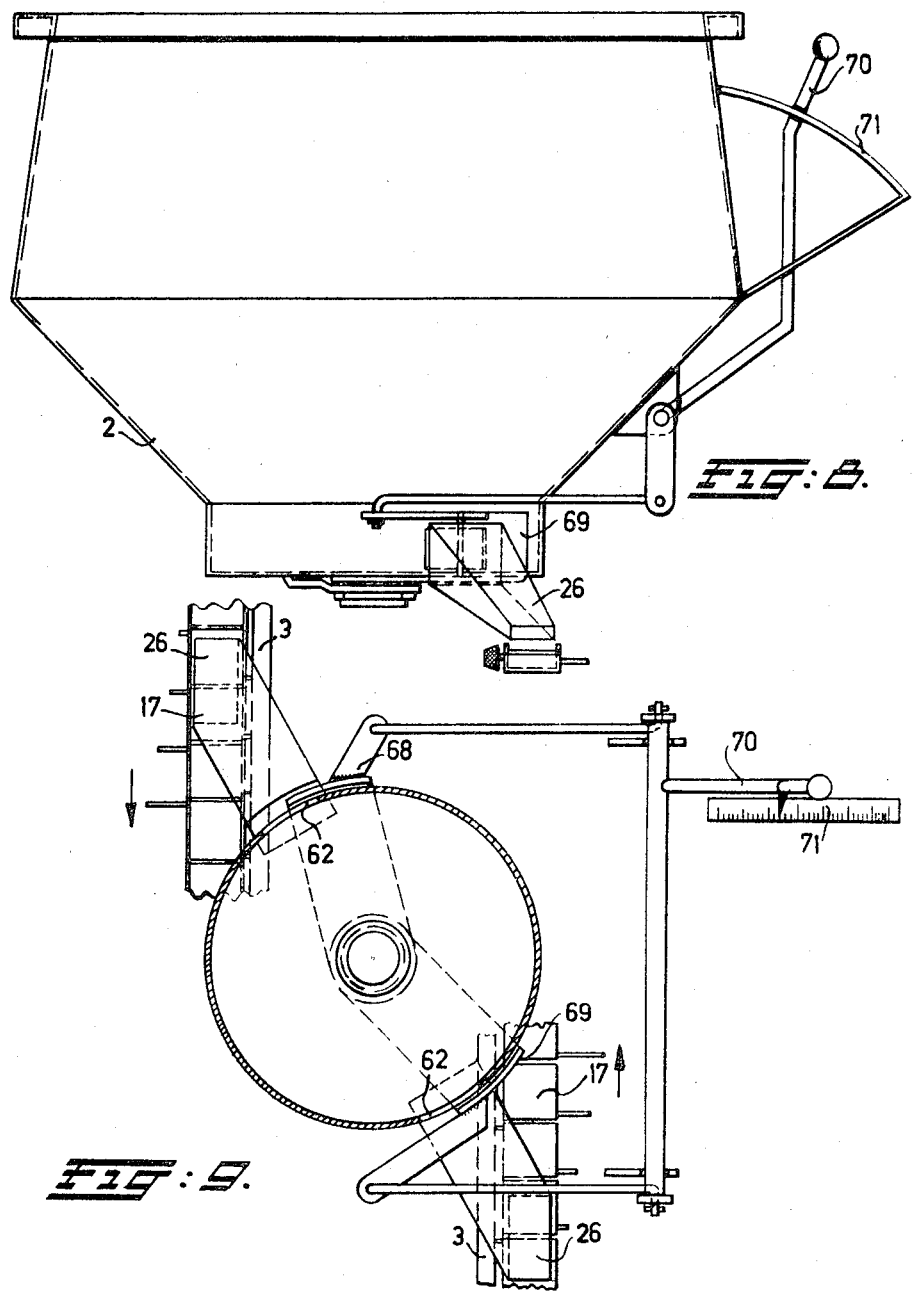

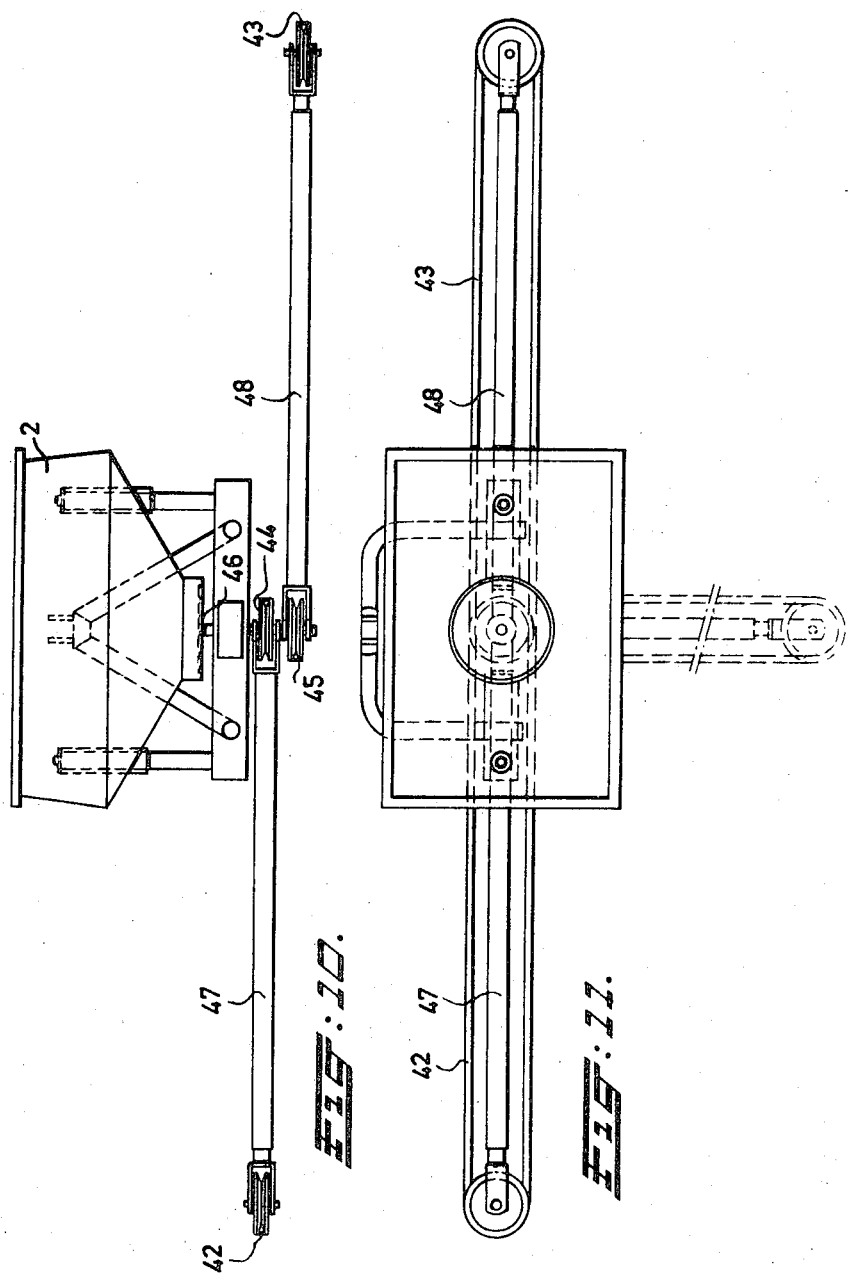

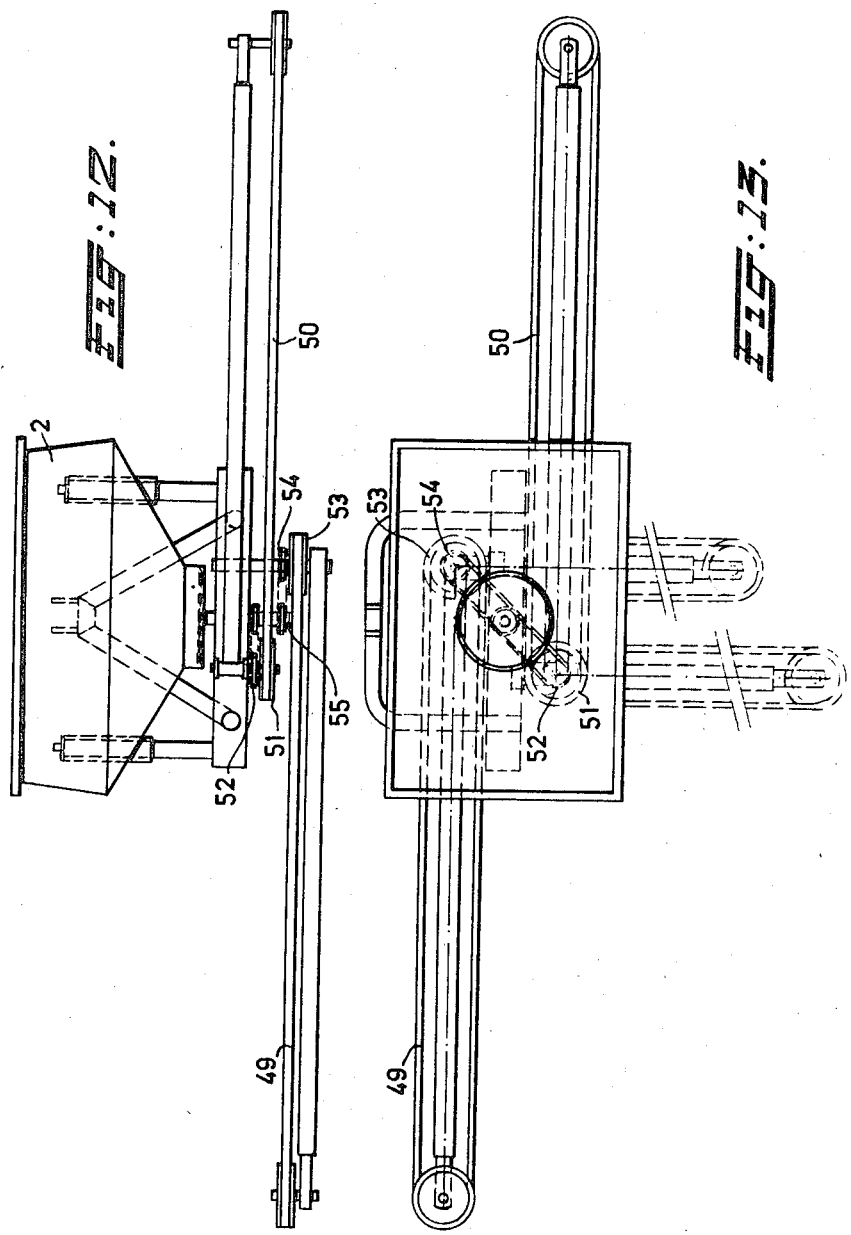

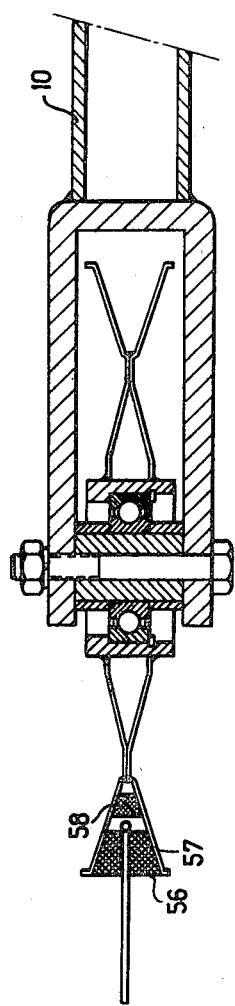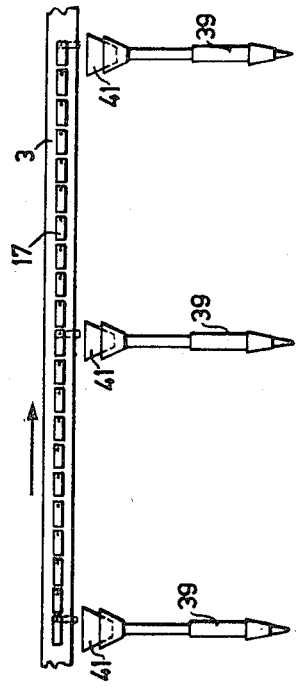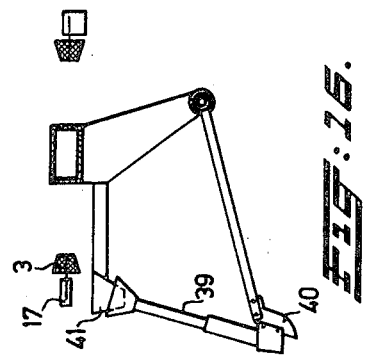

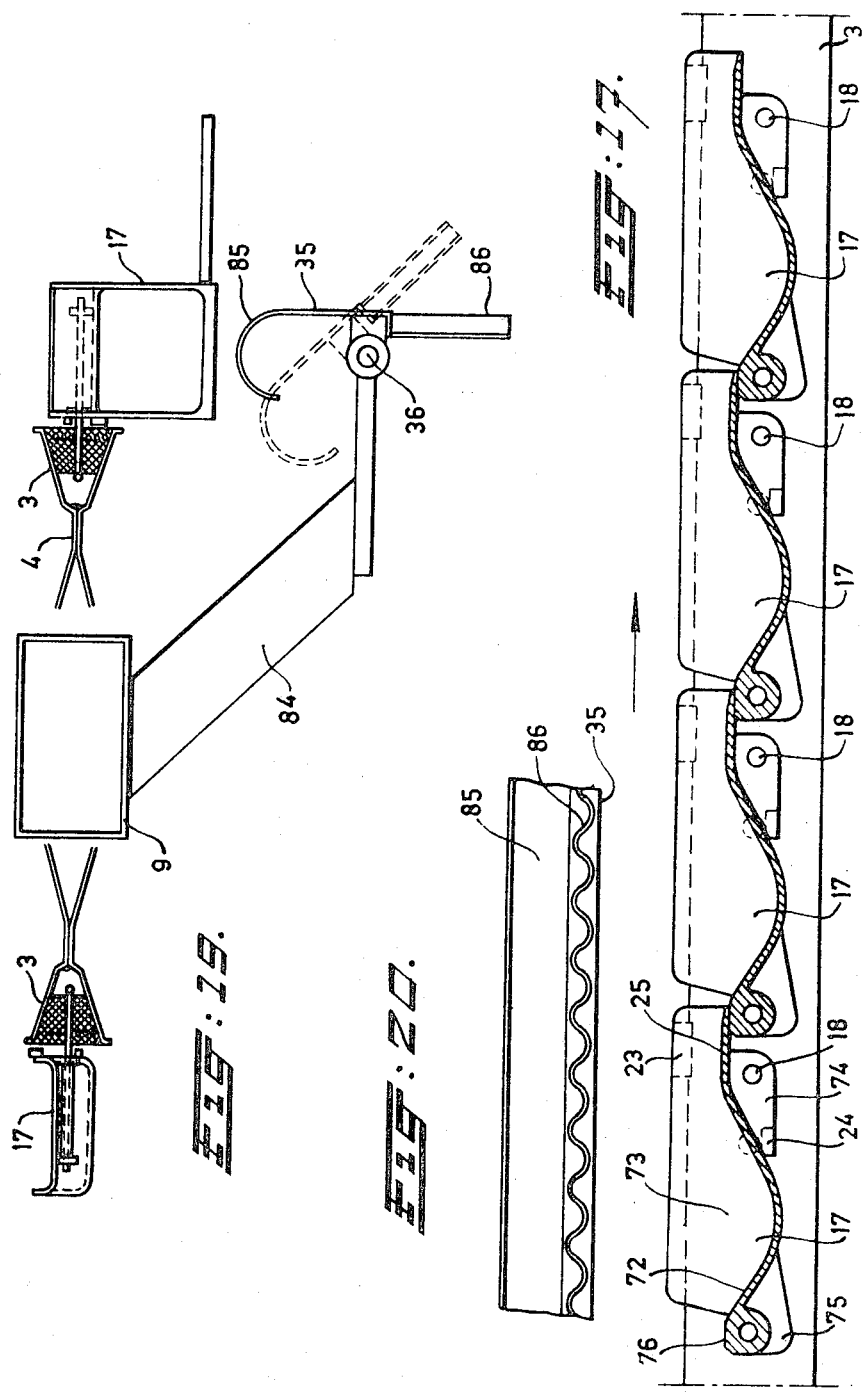

INVENTOR:
PETRUS W. ZWEEGERS

APPARATUS FOR SPREADING OR SOWING GRANULAR OR PULVERULENT MATERIAL

This invention relates to an apparatus for spreading or sowing granular or pulverulent material comprising a driven endless member adapted to be bodily moved in transverse direction.

In the known art, such an apparatus consists of a scraper conveyor mounted in transverse direction at the rear of a truck or tractor which carries the material to be spread. The scraper conveyor usually moves in a trough extending along the rear of the truck and there are slits in the bottom of the trough to discharge the material over the ground as the truck advances over the ground. The apparatus may be used for spreading fertilizer or for sowing seeds etc. Other known apparatus comprise a rotary centrifugal spreading disc instead of a driven endless member.

It is an object of the invention to provide another type of a spreading or sowing apparatus comprising a driven endless member bodily movable in transverse direction, which is of simple construction, is reliable in operation and most of all is capable of distributing the material very evenly over the width of the ground which is covered at each pass.

This is obtained according to the invention in that and apparatus for spreading or sowing granular or pulverulent material comprises a driven endless member adapted to be bodily moved in transverse direction, a series of trays mounted on the endless member, means for supplying material into each tray and means for discharging the contents of each tray at a predetermined position.

Preferably, the means for discharging the tray contents are operative at a plurality of different positions longitudinally of the driven endless member. The trays may be pivotally mounted on the endless member, which may be a V-belt, and there may be operating means along the length of the endless member, which keep the trays in horizontal position while passing the outlet opening of a hopper and which pivots each tray to an inclined or vertical position at predetermined points along the lengths of the endless member. In their horizontal positions, the succession of trays may present a continuous surface onto which material may be supplied from the hopper, and the points where the trays are pivoted to inclined positions may be chosen so that a very even distribution of the material is obtained over the width of the strip of ground over which the whole apparatus is bodily moved in transverse direction, e.g., by a tractor which also drives the endless member and, if so desired, an agitator means in the hopper.

Contrary to known apparatus in which the distribution of fertilizer over the width of the ground usually shows bands of higher and lower density, which has the consequence that the growth of the crop is uneven, the distribution of the material obtained by the apparatus of the invention is remarkably even and also well defined at the sides of the covered strip of ground, so that it requires little skill to make the next pass of the apparatus over the ground exactly adjacent to the previous pass without overlap or gaps, contrary to known apparatus in which a certain overlap is necessary because of the decreasing density of the distribution of the material toward the sides of each covered strip.

If desired, additional means for increasing the regularity of the distribution may be mounted under the trays, e.g., a distributing strip extending longitudinally of and under the endless member.

Several embodiments of the apparatus according to the invention will be further described with reference to the accompanying drawings.

Figure 21:
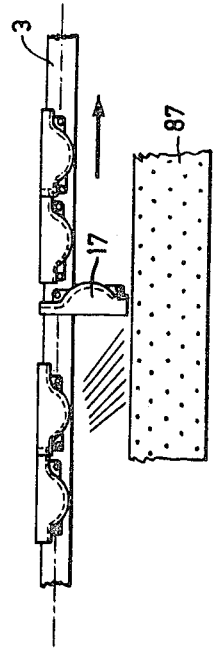
Figure 23:
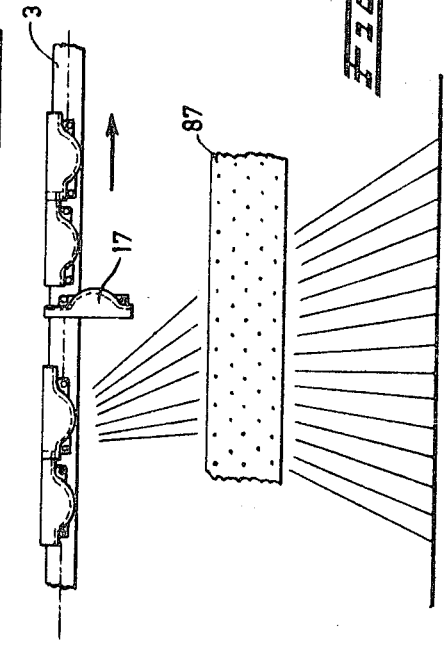
Figure 22:
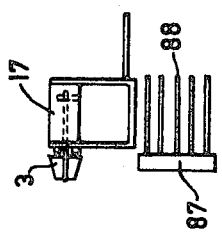
Figure 24:
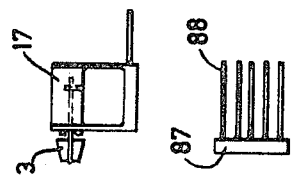

FIG. 1 is a rear view of one embodiment;
FIG. 2 is a plan view of the embodiment of FIG. 1;
FIG. 3 is a rear view, partly in section, of a part of the driven endless member of the embodiment of FIGS. 1 and 2;
FIG. 4 is a plan view of FIG. 3;
FIG. 5 is a plan view on a larger scale of part of the driven endless member of FIGS. 1 and 2;
FIG. 6 is a transverse cross section over the left sheave of the driven endless member of FIGS. 1 and 2;
FIG. 7 is a cross section of the hopper and the drive means;
FIG. 8 is a side view of the hopper;
FIG. 9 is a horizontal cross section at the level of the outlet openings of the hopper of FIG. 8;
FIG. 10 is a rear view of another embodiment;
FIG. 11 is a plan view of an embodiment of FIG. 10;
FIG. 12 is a rear view of a third embodiment;
FIG. 13 is a plan view of the embodiment of FIG. 12;
FIG. 14 is a cross section of part of the mounting and driving means of the driven endless member;
FIG. 15 is a partial rear view of an embodiment for sowing in rows;
FIG. 16 is a cross section of the embodiment of FIG. 15;
FIG. 17 is a view corresponding to FIG. 3 of another embodiment of the endless member;
FIG. 18 is a section corresponding to FIG. 7 of another embodiment of the hopper;
FIG. 18A is a plan view of a detail of FIG. 18;
FIG. 19 is a cross section of the mounting means of the endless member of an embodiment with a distributing strip, part of FIG. 19 being a cross section in another plane, namely through the sheave of the endless member;
FIG. 20 is a view from below of the distributing strip of FIG. 19;
FIG. 21 is a partial rear view of an embodiment with another type of distributing strip in a first position;
FIG. 22 is a cross section of FIG. 21;
FIG. 23 is a partial rear view of the embodiment of FIG. 21 with the distributing strip in a second position;
FIG. 24 is a cross section of FIG. 23.

In the embodiment according to FIGS. 1 and 2, the apparatus is mounted on a tubular frame 1, Said frame 1 carries a hopper 2 of an upper rectangular cross section and a circular bottom section, which hopper is supported on the upper ends 59 of vertical parts of the frame 1. The frame 1 moreover supports a driven endless member 3 on sheaves 4 and 5 at the outer ends of oppositely extending arms 9 and 10. The frame 1 also carries connecting points 6 and 7 and 8 for mounting the apparatus on the three-point linkage of a not shown tractor, so that the arms 9 and 10 extend transversely of the tractor behind the rear end thereof and the endless member 3 extends in a substantially horizontal plane. It can be driven from the power takeoff of the tractor via a vertical shaft 13 which is rotatably mounted in the frame 1. The shaft 13 carries a sheave 14 and a V-belt 15 passes around the sheave 14 and around another sheave 16 which is rotatably mounted in the forked outer end of the arm 10. The sheave 5 which carries the endless member 3, is mounted on the same shaft with the sheave 16 so that the endless member 3 is driven when the shaft 13 is rotated. The arms 9 and 10 can pivot in a vertical plane about the pivot pins 11 and 12, see the phantom lines in FIG. 1, so as to decrease the width of the apparatus for road transport. The endless member 3 may be a V-belt which can flex upwardly when the arms 9 and 10 are put in the upward position.

FIGS. 3 and 4 show a part of the endless member 3 which is movable from left to right and carries a series of trays 17 which are pivotally mounted on pins 20 extending transversely through the V-belt 3, see also the schematic view in FIG. 5. The trays 17 are preferably made of a lightweight material such as a synthetic resin which is molded to the desired shape. Each tray 17 comprises a bottom wall 72 an two lateral sidewalls such as 73. The pins 20 extend through a bore 18 in a protrusion 74 under the bottom wall 72 of each tray and are mounted at such a spacing in the V-belt 3 that the right end 25 of the bottom of each tray rests on the left end 76 of the bottom of the next tray when the successive trays are in horizontal position. A pin 19, which extends parallel to the pivot pin 20, is mounted in the thickened left end part 76 of the bottom wall of each tray so as to protrude laterally of the tray in a direction opposite to the side of the tray which is adjacent the V-belt 3. The purpose thereof will be explained later on. The length of the pins 19 is mutually different, see FIGS. 4 and 5, it increases from a minimum (left end of FIG. 4) in regular sequence to a maximum, e.g., in six steps, whereafter the next series of trays again starts with the minimum length, see especially FIG. 5. In FIG. 4, four different lengths are indicated, which are referenced, 19, 19', 19'', 19''' resp. Each series of trays may start with a tray which has no pin 19 at all, see FIG. 5.

The pivot pins 20 are U-shaped and both legs 21 and 22 thereof are pressed through holes which extend transversely through the V-belt 3. The longer leg 21 is the pivot pin for the tray 17, whereas the shorter leg 22 is a stop for delimiting the end positions of the pivoting tray. The sidewall 73 of each tray 17 adjacent the V-belt 3 carries two outer abutments 23 and 24 which cooperate with the leg 22 for defining said positions.

In FIG. 5 the lower circular part of the hopper 2 is shown in phantom lines. It has two opposite discharge nozzles 26, see also FIG. 8, which are inclined both to the direction of motion of the tractor and to the horizontal. The two nozzles 26 end above the series of trays and in operation they discharge a regular flow of material to fill the successive trays passing underneath. In this part of the trajectory, the trays 17 are held in horizontal position by a strip 29 which extends under the trays and the initial part of which (the right part in the upper run of the belt 3 (in FIG. 5) is upwardly inclined so as to transfer the oncoming trays from their vertical or depending position to their horizontal or material receiving position. Past the nozzles 26, the strip 29 ends and the trays 17 are kept in horizontal position by their pins 19 which rest on a guiding ledge 27, see the lower part of FIG. 5. The side of the ledge 27 which is adjacent to the trays 17, has a stepped configuration as viewed from above, so that each tray 17 can pivot from its horizontal to a more or less vertical position as soon as its pin 19 reaches the end of the step of the ledge 27 which matches the length of the respective pin 19. In the left part of FIG. 5, the side of the ledge 27 extends under the trays so as to keep those trays which have no pin 19 in horizontal position. The successive stages in which 1, 2, 3, etc., trays or their pins 19 respectively, have left the supporting ledge 27 are shown in FIG. 5. At the end 28 of the ledge 27, all trays are in depending position. At each step of the ledge 27 one tray discharges its contents, so that small quantities of material such as fertilizer are spread over the ground in areas centered on the steps of the ledge 27. By a judicious choice of the location of the steps, one obtains a very even distribution of the material. After passing around the sheave 4 or 5 respectively, the trays reach the strip 29 and return to their horizontal material receiving position.

A means for cleaning the trays may be positioned upstream from the nozzle 26 so that the material cannot build up into solid depositions in recesses of the trays. This means may be a rotary brush 30 which is mounted inclined with respect to the V-belt 3, so that it is set in motion by the passing trap 17.

FIG. 6 shows the forked outer end of the supporting arm 10 which supports two ball bearings 31 and 32 carrying a hub 33 for rotation about a substantially vertical axis. Both the sheave 5 for the V-belt 3 and the sheave 16 for the drivebelt 15 are mounted on the hub 33. A cap or cover 34 encloses the V-belts 15 and 3 as well as their attached parts. Said cap may be pivotally mounted at or near the pivot pins 11 and 12 of the arms 9 and 10 and it may carry the ledge 27 and the strip 29, as well as a flexible strip or flap 37 which surrounds the moving parts of the apparatus and prevents blowing away of very lightweight pulverulent material by the wind. One or more supporting and/or tensioning sheaves 38 may be mounted along the length of the V-belt 3, e.g., on the arms 9 and 10. The sheaves 38 may or may not be grooved.

If the apparatus is intended for sowing in rows, seed tubes 39 with coulters 40 may be mounted under the positions in which the trays 17 are pivoted to their discharge position, see FIGS. 15 and 16. A feed tunnel 41 for each seed tube 39 may be mounted on the arms 9 and 10 so as to be positioned between the discharging trays 17 and the entrance of the seed tube 39. The means for determining the discharge position of each tray 17, such as the ledge 27, should correspond to the spacing of the seed tubes 39. They may be mounted so as to be replaceable or adjustable.

In the embodiment of FIGS. 1 and 2, there is a single driven endless member 3 which extends at both sides of a central hopper 2. In an alternative embodiment, see FIGS. 10 and 11, the apparatus comprises two endless driven members 42 and 43 each of which extends to one side of the hopper 2, transversely to the direction in which the apparatus is bodily moved over the ground by a tractor e.g., this is especially suitable when a large width should be covered at each pass of the apparatus. It is also conceivable to use more than two aligned driven endless members. The hopper 2 is mounted over a central vertical shaft 46 which carries two sheaves 44 and 45 at different heights, whereas arms 47 and 48, which carry the outer sheaves for the two endless members 42, and 43, are pivotally mounted on the same shaft 46, e.g., by forked ends which straddle the sheaves 44 or 45 respectively. Thus, the two endless members 42, 43 overlap sufficiently to obtain an even distribution of the spread material in the central part of the apparatus and on the other hand, the two arms 47 and 48 can be pivoted to a rearward position to decrease the width of the apparatus for road transport (see the phantom lines in FIG. 11). The shaft 46 drives both endless members 42 and 43 via the sheaves 44 and 45.

In the embodiment of FIGS. 12 and 13, the two driven endless members 49 and 50 are not aligned in transverse direction of the apparatus but the endless member 49 is placed in front of the endless member 50. They may be arranged in the same horizontal plane, but in the shown embodiment the member 50 is in a higher plane than the member 49. The endless members 49 and 50 extend to opposite sides of the central vertical shaft 55 which carries two sprockets for chain-driving a sprocket 52 or 54 respectively on the adjacent sheave 51 or 53 respectively of the endless member 50 or 49 respectively. Thus, the central shaft 55 drives both endless members 49 and 50. Both endless members can pivot about the axis of the sheave 51 and 53 respectively to a rearwardly extending road transport position shown in the phantom lines in FIG. 13.

In some embodiments, in which the endless tray-carrying member is a V-belt and is driven by another V-belt, it is possible to carry both V-belts on the same sheave at the outer end of a supporting arm such as 10. In FIG. 14, a sheave 57 has a deep V-groove in which a relatively heavy V-belt 56 is held in an outer position and a relatively small V-belt 58 is held in an inner position. The belt 56 will be the tray-carrying belt and the belt 58 will be the drive belt. In such an embodiment, the V-belt 58 is located within the area enclosed by the tray-carrying belt and is thus protected against damage.

The hopper 2 is so supported on the upper ends 59 of column shaped parts of the frame 1 that it can oscillate with respect to the frame 1, see FIG. 7. A vibratory oscillating movement of the hopper 2 is obtained by connecting the hopper 2 to an eccentric 61 of a horizontal shaft 60 which extends in a fore-and-aft direction in bearings in the frame 1 and is adapted for connection to the power takeoff of a tractor or the like. The shaft 60 drives the vertical central shaft 13 via bevel gears 66 and 67. As stated before, the central shaft 13 carries a sheave 14 for a drivebelt 15 which drives a sheave 16 connected to the sheave 5 for the tray-carrying belt 3. Above the sheave 14, the shaft 13 is extended into the lower circular part of the hopper 2. On the upper end of the shaft 13, a disc shaped agitator 63 is held by a spring clip 64 and a coil spring 65. The rotating movement of the agitator 63 in combination with the vibratory movement of the hopper 2, caused by the eccentric 61, ensure that the material stored in the hopper 2 is discharged in a regular flow through the two outlet openings 62 in the vertical wall of the lower part of the hopper 2, and that bridge building in the hopper 2 is prevented.

FIG. 9 shows the position of the two outlet openings 62 and the discharge nozzles 26 which communicate with said openings. As shown by the arrows in FIG. 9 (see also FIG. 5) the direction of the movement of the endless member 3 is so selected with respect to the inclination of the nozzles 26 that the trays 17 of each run of the belt are filled before they reach the median plane of the apparatus. This makes it possible to start the discharge of the material from the trays 17 at any desired portion immediately downstream from said median plane so that, by appropriate selection of the location of the steps of the ledge 27, the discharged strips of material of the two runs of the endless member 3 can meet exactly in said median plane and an even distribution of the material in the central part of the apparatus is ensured.

The amount of material flowing from the nozzle 26 can be regulated by slides 68 and 69 which can rotate about the axis of the hopper 2 for closing the outlet openings 62 to the desired extent. This extent is regulated by links connected to a handle 70, which is provided with a pointer cooperating with a scale 71 for showing the extent of closure of the discharge openings. If desired, means may be provided for closing one of the openings 62, e.g., by disconnecting one of the links from the lever 70, so as to spread material to one side of the tractor only, e.g., when moving along a ditch.

According to FIG. 3, the bottom wall 72 of each tray 17 has an elongated recess for holding the material. If the material to be spread has a tendency to compact to solid depositions in the corners of the recess, it is preferred to use an embodiment such as shown in FIG. 17, in which the bottom wall 72 has no sharp corners but, seen in longitudinal section, it extends obliquely downwardly in fluent lines from the front and the rear part 25 and 76 respectively of the bottom wall, so as to have a shallow V-shape or a part-circular shape. Under the rear part 76 of the bottom wall, a downwardly directed protrusion 75 may be provided to engage the guiding strip 29 so as to prevent wear of the central part of the wall 72.

In the embodiment of FIG. 7, the lower part of the hopper 2 oscillates with respect to the agitator 63. In some cases, there is danger of damaging the material in the hopper 2 between the agitator and the surrounding wall. This is prevented in the embodiment of FIGS. 18 and 18A, in which the agitator 63 is mounted on a shaft 77 which is rotatably journaled in the bottom of the hopper 2. The shaft 77 protrudes under the bottom of the hopper 2 and its lower end carries a horizontal arm 78 which has two depending shafts 79 and 80 at its outer ends. Rollers 81 and 82 are rotatable on the shafts 79 and 80 respectively. The vertical central shaft 13 terminates short of the shaft 77 and its upper end carries a horizontal arm 83 which extends between the rollers 81 and 82. Thus, the shaft 13 can drive the agitator 63 while permitting oscillating movement of the shaft 77.

FIG. 19 shows in cross section the supporting arm 9 e.g., of the endless member 3 of FIGS. 1 and 2. A distributing strip 35 which extends longitudinally of the apparatus under the series of trays 17, is pivotally mounted on a bracket 84 which is welded to the arm 9. The strip 35 can be adjusted by rotation about the pivot pin 36 between a vertical position shown in full lines in FIG. 19 and an inclined position shown in phantom lines. In the embodiment of FIGS. 19 and 20, the strip 35 has an upper edge 85 which is curved over 180° and which, in the vertical position of the strip 35, is positioned directly under those trays 17 of the endless member 3 on which the discharging means operate to pivot them to a depending position. Thus, the material dropping from the trays 17, falls on the curved upper edge 85 of the strip 35 and is divided into rearwardly and forwardly directed streams. This position of the strip 35 is used with pulverulent material to prevent material from falling on the ground in a coherent mass.

If granular material is to be spread, the strip 35 is fixed in the inclined position, in which the granules dropping from the trays 17 fall on the inclined main surface of the strip 35 and are then rearwardly directed in a more even flow. If desired, the lower part of the main surface of the strip 35 can be provided with undulations 86 to promote the even distribution of the material when in this position.

If the apparatus is intended for spreading only certain types of material, e.g., only granular material, a simple embodiment of the distributing strip 35 can be used, such as shown in FIG. 6. The flow of material can be regulated by adjusting the inclination of the strip 35.

Another type of distributing strip is shown in FIGS. 21–24. In this embodiment, brackets of the supporting arms of the endless member 3 carry a vertical strip 87 from which series of horizontal pins 88 extend in rearward direction. The strip 87 may be adjustable in vertical direction. It extends longitudinally of the trays 17 and laterally thereof so that the pins 88 extend under the trays 17. The pins serve for distributing the material falling from the trays 17 as shown in FIGS. 21 and 23. The height of the strip 87 with respect to the trays 17 is adjusted in relation to the properties of the material such as particle size. The position shown in FIGS. 21 and 22 is suitable for granular material, whereas the relatively low position of the strip 87 in FIGS. 23 and 24 is suitable for pulverulent material such as lime.

Within the scope of the invention, several other variants are possible. Whereas FIG. 5 shows a continuous series of trays, it is possible to leave a gap of about the size of one tray between the successive series, e.g., by removing those trays 17 which do not have a pin 19 in FIG. 5. In such an embodiment, the outlets 26 of the hopper 2 should be carefully positioned and the amount of material discharged from the outlets 26 should be carefully chosen so that the outlets 26 may discharge directly onto the ground each time a gap between the successive series of trays passes beneath an outlet 26.

In all embodiments shown, the trays 17 pivot about axes which are normal to the driven endless member but it is also possible to mount the trays on pivots which extend parallel to the driven endless member. The endless member may be a chain or band instead of a belt. The means for determining the discharge location of each tray may have other forms such as a cam track. Instead of using separate tensioning rollers 38, the endless member may be tensioned by making the length of the supporting arms such as 9 and 10 adjustable.

What I claim is:

1. Mobile agricultural spreader for particulate material such as fertilizer, comprising an endless member driven in its longitudinal direction and adapted to be bodily moved transverse to said longitudinal direction, a series of trays each independently mounted in regularly spaced apart positions along said endless member, said trays being arranged to dump their contents without themselves leaving said endless member, said trays moving with said endless member, a supply hopper for the particulate material, said hopper having at least one outlet positioned over the path of movement of said trays so as to fill successive trays as said endless member is driven, said endless member having a run extending from said hopper outlet for carrying said trays away from said hopper outlet after said trays are filled and a series of control means regularly spaced along said run, each of said trays having a follower means cooperable with only one of said control means for dumping the particulate contents of that tray, the follower means of each tray being cooperable with a control means different from the control means with which the follower means of each of the other trays cooperates, whereby the contents of said trays are dumped at spaced-apart points along said run.

2. Apparatus according to claim 1 in which said endless member has a second run extending to said hopper outlet for carrying empty trays to be filled toward said hopper outlet, and including a supporting strip extending under said trays as they move toward said hopper outlet to maintain said trays in their undumped positions, the initial part of said supporting strip being inclined to engage and smoothly pivot said trays from their dumped to the undumped positions.

3. Apparatus according to claim 1 in which said trays are arranged in groups, each two successive groups of trays being separated by a space about equal to the dimension of one tray and undumped position measured along the length of said endless member.

4. Apparatus according to claim 1, in which a seed tube is mounted under each different dump point.

5. Apparatus according to claim 1, in which a means for cleaning the trays is positioned upstream from the supply hopper.

6. Apparatus according to claim 5, in which said cleaning means is a rotary brush, the axis of which is inclined with respect to the longitudinal direction of the driven endless member.

7. Apparatus to claim 1 in which a cover plate is mounted over the driven endless member.

8. Apparatus according to claim 7, in which a flexible strip depends from the edges of the cover plate.

9. Apparatus according to claim 1 including a series of U-shaped pins extending transversely through said endless member, the legs of each of said pins having different lengths, and the longer leg of each pin serving as the pivot for one of said trays.

10. Apparatus according to claim 9 in which the shorter leg of each pin provides a stop for defining the undumped position of one of said trays.

11. Apparatus according to claim 10 including two abutments carried by each tray, said abutments being cooperable with said shorter pin leg to define the dumped and undumped positions of each tray.

12. Apparatus according to claim 1 including a hopper having a vertical axis, and in which two driven endless members are mounted for rotation in substantially horizontal planes so as to extend in parallel relationship on opposite sides of said hopper, the inner ends of said endless members overlapping, said hopper being mounted over the overlapping inner ends of the two driven endless members.

13. Apparatus according to claim 12, in which the two driven endless members are mounted in the same plane and their inner ends are positioned at opposite sides of the vertical hopper axis.

14. Apparatus according to claim 12, in which the two driven endless members are mounted in different horizontal planes and their inner ends are guided around sprockets or sheaves which are coaxial with the hopper axis.

15. Apparatus according to claim 1 in which each tray is pivotally mounted on said endless member, said control means including a ledge extending along said run, said ledge having an edge facing said run formed with a stepped configuration, and said tray-associated means includes a protrusion carried by each tray of groups of successive trays, the protrusion of each tray of a group being longer than the protrusion of the tray immediately preceding it but shorter than the protrusion of the tray immediately succeeding it, said protrusions being slidable on said ledge but leaving said ledge one-by-one as each step of the ledge is reached.

16. Apparatus according to claim 15, in which the pivot axis of each tray is normal to the driven endless member.

17. Apparatus according to claim 15 in which the number of steps of said ledge edge corresponds to the number of different length protrusions in each group of trays.

18. Apparatus according to claim 15 in which said ledge is interchangeable with ledges having different stepped dimensions.

19. Apparatus according to claim 1 in which all said trays when in their undumped positions together form an uninterrupted surface.

20. Apparatus according to claim 19, in which each tray has a bottom, two upstanding sidewalls extending longitudinally of the driven endless member, and front and rear edges, the front and rear edges of successive trays overlapping so as to provide said continuous surface and the bottom of the tray between said overlapping edges being recessed.

21. Apparatus according to claim 20, in which the bottom of each tray has a downward directed protrusion under its rear edge.

22. Apparatus according to claim 20, in which the bottom of each tray, in longitudinal section, extends obliquely downward in fluent lines from the front and rear edges.

23. Apparatus according to claim 22, in which the bottom of each tray has a shallow V-shape in longitudinal section.

24. Apparatus according to claim 22, in which the bottom of each tray has a part-circular longitudinal section.

25. Apparatus according to claim 1 which a distributing strip is mounted so as to extend in longitudinal direction under the series of trays.

26. Apparatus according to claim 25 in which the strip has a lower portion which is undulated to define ridges and grooves thereof extending transversely of the strip.

27. Apparatus according to claim 25, in which the inclination of the distributing strip in a longitudinal direction with respect to the horizontal is adjustable.

28. Apparatus according to claim 27 in which the distributing strip has, in cross section, a main part and curved upper edge and is adjustable between an inclined position in which the main part of the upper surface of the strip is under the trays and a vertical position in which the curved upper edge of the strip is under the trays.

29. Apparatus according to claim 25, in which said strip is substantially vertically positioned and carries several series of horizontal pin means such that the strip itself extends laterally of the trays and the pins extend under the trays.

30. Apparatus according to claim 29, in which the spacing of the strip with respect to the trays is adjustable.

31. Apparatus according to claim 1 on which a single driven endless member is mounted for rotation in a substantially horizontal plane, said endless member having a central region an two runs extending oppositely therefrom, and a hopper is mounted over the central region of the driven endless member.

32. Apparatus according to claim 31, in which the hopper has two oppositely disposed outlets each discharging over an outwardly moving run of the driven endless member.

33. Apparatus according to claim 31, in which the hopper and the driven endless member are mounted in a frame adapted to be mounted behind a tractor so as to extend transversely thereof, a central drive shaft being journaled in the frame and being adapted for connection to a power takeoff of the tractor.

34. Apparatus according to claim 33, including a horizontal drive shaft, a vertical drive shaft, and in which the hopper comprises a rotary agitator mounted on the vertical shaft, and gearing connecting the vertical drive shaft and the horizontal drive shaft.

35. Apparatus according to claim 34, in which a sheave of the driven endless member has a V-groove which carries the driven endless member in an outward position and also a V-type drivebelt in a more inward position, said drivebelt also passing over a sheave on a vertical shaft under the hopper which shaft is connected by gearing to the horizontal drive shaft.

36. Apparatus according to claim 33, in which the two oppositely extending runs of the single endless driven member are guided over outer sprockets or sheaves which are mounted on the outer ends of outwardly extending arms, the inner ends of which are connected to the frame.

37. Apparatus according to claim 36, in which the length of the arms is adjustable.

38. Apparatus according to claim 36, in which the inner ends of the arms are pivotally connected to the frame.

39. Apparatus according to claim 38, in which the arms are pivoted at both sides of the hopper for pivoting movement in a substantially vertical plane.

* * * * *